United States Patent [19]

Mikame

[11] 4,271,442
[45] Jun. 2, 1981

[54] PLANE MAGNETIC RECORDING MEDIUM

[75] Inventor: Yoshio Mikame, Tokyo, Japan

[73] Assignee: TDK Electronics Co., Ltd., Tokyo, Japan

[21] Appl. No.: 25,074

[22] Filed: Mar. 29, 1979

[30] Foreign Application Priority Data

Apr. 10, 1978 [JP] Japan ................................ 53-41856

[51] Int. Cl.³ ........................................... G11B 21/10
[52] U.S. Cl. ..................................... 360/131; 360/77
[58] Field of Search ..................... 360/131, 133–135, 360/77, 110, 119, 122

[56] References Cited

U.S. PATENT DOCUMENTS

| 3,769,465 | 10/1973 | Wellbrock | 360/77 X |
| 3,911,483 | 10/1975 | Kihara et al. | 360/77 X |

OTHER PUBLICATIONS

IBM/TDB vol. 15, No. 3, Aug. 1972, pp. 752–753, "Discrete Magnetic Recording System", by Shew.

*Primary Examiner*—John H. Wolff
*Attorney, Agent, or Firm*—Oblon, Fisher, Spivak, McClelland & Maier

[57] ABSTRACT

A plane magnetic recording medium comprises a data track traced by a magnetic head wherein said data track is initiallized to have each width smaller than a width of the trace of the magnetic head whereby modulation in its reproducing output can be minimized.

2 Claims, 6 Drawing Figures

PLANE MAGNETIC RECORDING MEDIUM

BACKGROUND OF THE INVENTION

1. Field of the Invention

The present invention relates to a plane magnetic recording medium.

2. Description of the Prior Art

The plane magnetic recording mediums have been widely used as a memory element for the data processing apparatus and it has a magnetic layer coated on a disc substrate made of polyester, etc. The magnetic recording mediums commercially available have been treated by processes for writing-in track numbers, sector numbers and other necessary data which is referred to as "initiallizing".

FIG. 1 shows one embodiment of the initiallized magnetic recording medium wherein the reference numeral (1) designates a magnetic recording medium formed in disc shape; (1a) designates a central opening formed at the axial center of the magnetic recording medium (1) and (2) designates a data track initiallized in coaxial relation with the central openin (1a). Each data track is equally divided into a number of sections such as 26 sections in the radial direction to form the corresponding number of sectors (3). Each sector (3) consists of an ID field (3a) and a data field (3b) as shown in FIG. 2.

An operator reads the ID field (3a) from the initiallized data track (2) to confirm the track numbers or the sector numbers and then data can be written in the data field (3b) or the written data is read out from the data field.

Thus, in the conventional magnetic medium, the initiallizing has been given so that the width of the data track is identical (2) with an effective width (such as 300±25 μm) of the magnetic head for the write-in and read-out of the flexible disc apparatus. However, even though the data track (2) is initiallized to be in a precisely coaxial circle about the physical center 0 of the magnetic recording medium (1), a revolutional center 0' of the magnetic recording medium as chucked is deviated from the physical center 0 of the same (FIG. 3) because of the tolerance of the central opening (1a) and the tolerance of the flexible device for chucking the magnetic recording medium whereby a trace (4) of the magnetic head is deflected from the data track (2). Thus, a reproducing output induced in the magnetic head is varied depending upon the revolution of the magnetic recording medium (1).

The variation of the reproducing output is referred to as modulation. When the modulation is caused, a missing error is easily caused in low reproducing output range (a) and an extra error is easily caused in high reproducing output range (b), disadvantageously.

The threshold level is also varied by the level variation of the reproducing output to cause unstable operation.

SUMMARY OF THE INVENTION

It is an object of the present invention to overcome the disadvantage of the conventional magnetic recording medium and to provide an improved magnetic recording medium having high reliability which substantially prevents the modulation, or if occurred, which minimizes the modulation to be negligible.

The foregoing and other objects of the present invention have been attained by providing a plane magnetic recording medium comprising a data track traced by a magnetic head wherein the data track is initiallized to have each width smaller than the width of the trace of the magnetic head.

DETAILED DESCRIPTION OF THE PREFERRED EMBODIMENTS

Figure 1:
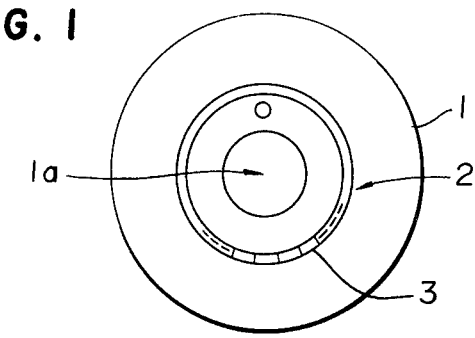
FIGS. 1, 2, 3 and 4 are respectively schematic views of the conventional plane magnetic recording medium.
Figure 2:
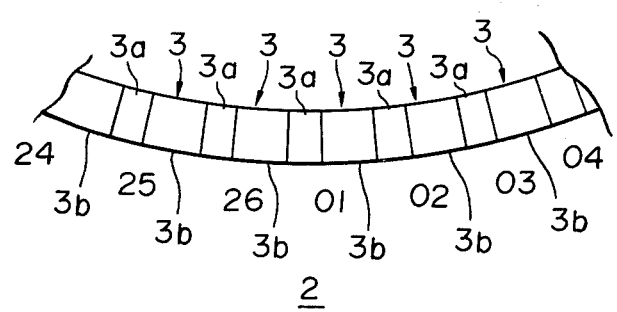
Figure 3:
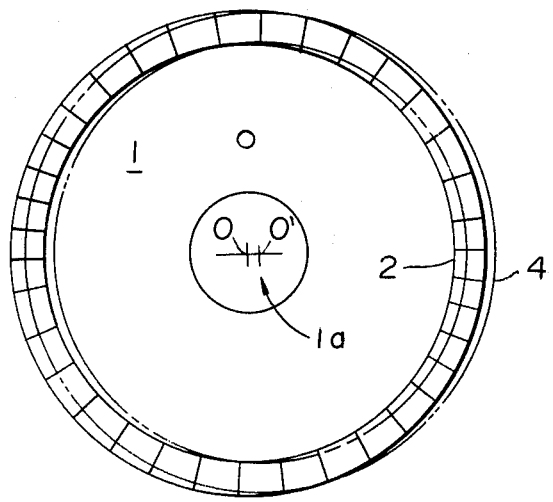
Figure 4:
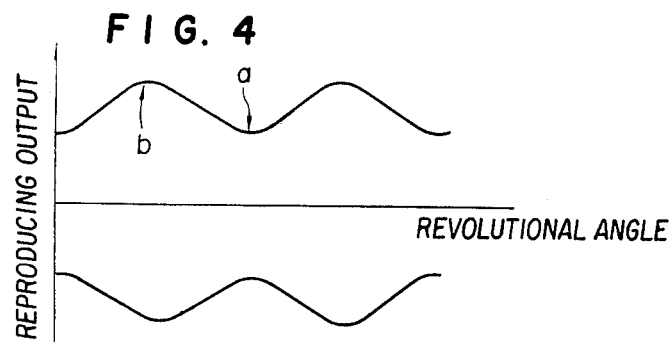

Referring to the drawings, the present invention will be illustrated.

Figure 5:
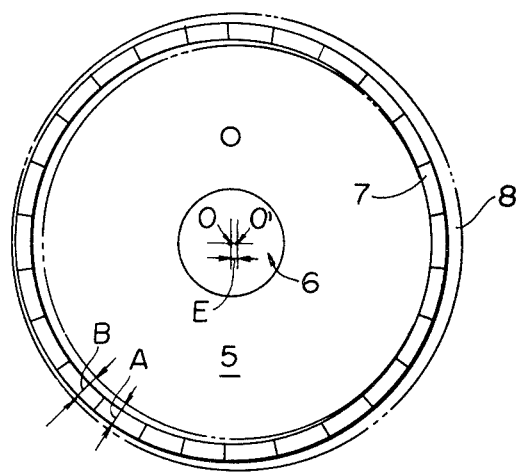
FIG. 5 is a schematic view of an embodiment of the magnetic recording medium of the present invention.

FIG. 5 shows a schematic view of the magnetic recording medium prepared according to the present invention wherein the reference numeral (5) designates a disc shaped magnetic recording medium and (6) designates a central opening formed in coaxial relation with a physical center 0 of the magnetic recording medium (5). A revolutional driving shaft (not shown) of a flexible disc device is fitted in the central opening (6) to rotate the magnetic recording medium. The symbol 0' designates the revolutional center. The reference numeral (7) designates a magnetic data track initiallized on the recording surface of the magnetic recording medium (5) and the data track (7) is initiallized in coaxial relation with the physical center 0 of the magnetic recording medium (5). The reference numeral (8) designates a trace of the magnetic head for reading-out and it is formed in a coaxial circle about the revolutional center 0' when the magnetic recording medium (5) is revolutionally driven by the flexible disc device.

The data track (7) is formed to have the width A smaller than the width B of the trace (8) of the magnetic head. In the structure, even though a deviation E is produced between the physical center 0 and the revolutional center 0' of the magnetic recording medium (5), a reproducing output can be constant to prevent the modulation because the data track is included in the width of the trace (8) of the magnetic head.

The width of the trace 8 is, of course, smaller than the sum of the width of the track 7 and the space between the track 7 and an adjoining track, since otherwise two tracks would be read simultaneously.

Appropriate means, well known in the art, may be used for positioning the magnetic head adjacent track 7.

Figure 6:
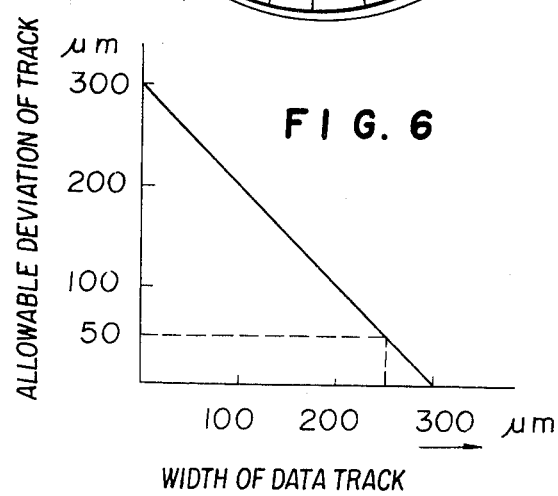
FIG. 6 is a diagram showing relation of the width of the data track to the deviation degree.

Even though the deviation E is increased, the modulation can be reduced comparing to the conventional magnetic recording medium. FIG. 6 shows effect of the reduction of the modulation wherein the modulation is increased depending upon decreasing the width A of the data track (7) to the width B of the trace (8) of the magnetic head, whereas a reproducing output level is decreased depending upon decreasing the width A of the data track (7). Accordingly, it is effective to broaden the width A of the data track (7) in a range that the modulation is allowable.

In the magnetic recording medium, the tolerance of the central opening (6) is ±25 μm and the tolerance of the trace (8) of the magnetic head is ±25 μm and accordingly, an estimated maximum deviation is ±50 μm is summing both tolerances. Therefore, when the effective width of the magnetic head for defining the width B of the trace (8) is 300 μm, the width A of the data track (7) is initiallized to be 250 μm whereby occurrence of the modulation of the magnetic recording medium prepared under the tolerances can be completely prevented.

As stated the above, the present invention is to provide a plane magnetic recording medium comprising the data track traced by the magnetic head, an improvement characterized in that the width of the data track is formed smaller than the width of the trace of the magnetic head whereby the modulation in the reproducing output of the magnetic head can be minimized so as to prevent the missing error and the extra error and to give a stable threshold level to improve the reliability of the magnetic medium.

What is claimed as new and desired to be secured by Letters Patent of the United States is:

1. A magnetic recording system comprising:
    a plane magnetic recording medium having a plurality of parallel tracks of a predetermined width, said tracks being spaced from one another by predetermined spacings;
    a magnetic head having a predetermined width, said width of said head being greater than said width of one of said tracks and less than the sum of the widths of one of said tracks and one of said spacings;
    means for positioning said head adjacent one of said tracks; and
    means for moving one of said medium and said head relative to the other to form a tracing, said tracing having a path substantially identical to the length of said tracks and a width equal to said width of said head, the maximum variations between the length of said one of said tracks and the path of said tracing being less than the excess in the width of said head over the width of said one of said tracks, whereby said length of said one of said tracks is always entirely within said width of said tracing.

2. A plane magnetic recording medium according to claim 1 wherein the width of the data track is less than 250 μm.

* * * * *